United States Patent [19]

Newman

[11] Patent Number: 4,930,436
[45] Date of Patent: Jun. 5, 1990

[54] SELECTIVELY POSITIONABLE WEATHER VANE AND DISPLAY FOR VERTICAL POST

[76] Inventor: Joseph Newman, 32 Brookfield Way, Robbinsville, N.J. 08691

[21] Appl. No.: 306,622

[22] Filed: Feb. 3, 1989

[51] Int. Cl.⁵ ............................................. G01W 1/00
[52] U.S. Cl. ...................................... 116/264; 73/188; 248/230; 248/231.6; 384/502
[58] Field of Search .......................... 40/440, 479, 602; 73/188; 116/173–175, 264, 265, 273, 275; 248/230, 231, 415, 231.6; 446/176, 217, 218; 384/273, 424, 502

[56] References Cited

U.S. PATENT DOCUMENTS

| | | | |
|---|---|---|---|
| 159,550 | 2/1875 | King | 40/607 |
| 160,150 | 2/1875 | Bryan | 73/188 |
| 215,028 | 5/1879 | Turner | 73/188 |
| 230,007 | 7/1880 | Hardy | 40/607 |
| 829,064 | 8/1906 | Elder et al. | 116/173 |
| 842,693 | 1/1907 | Patterson | 40/479 |
| 1,122,434 | 12/1914 | Steffes | 73/188 |
| 1,953,272 | 4/1934 | Smith | 40/37 |
| 2,799,240 | 7/1957 | Andrews | 116/174 |
| 2,965,991 | 12/1960 | Simmons | 40/39 |
| 3,233,456 | 2/1966 | Mills | 73/188 |
| 3,354,715 | 11/1967 | Causey | 73/188 |
| 3,395,577 | 8/1968 | Keim | 116/174 |
| 3,815,412 | 6/1974 | Keim | 73/188 |
| 4,031,656 | 6/1977 | Kupperman et al. | 46/53 |
| 4,227,406 | 10/1980 | Coffey | 73/188 |

FOREIGN PATENT DOCUMENTS 9509 of 1899 United Kingdom .................. 40/479

Primary Examiner—Cuchlinski, Jr. William A.
Assistant Examiner—W. Morris Worth
Attorney, Agent, or Firm—Kenneth Watov

[57] ABSTRACT

A weather vane and display includes a stop-member in two half sections for mounting at any desired position on a vertical post by clamping the two half sections together upon the post, a rotatable element in two half sections for mounting together about the post immediately above the stop-member, with the rotatable element being free to rotate about the post and upon the top edge of the stop member, with protruding studs from the rotatable elements providing brackets for mounting mannequins or display signs on either side of the rotatable element, whereby the displays or mannequins are rotated to a position in accordance with the prevailing direction of wind at a given time.

25 Claims, 4 Drawing Sheets

SELECTIVELY POSITIONABLE WEATHER VANE AND DISPLAY FOR VERTICAL POST

FIELD OF THE INVENTION

The field of the present invention relates generally to weather vanes, and more specifically to wind vane-like displays for mounting on vertical post.

BACKGROUND OF THE INVENTION

Weather vanes and weather vane-like displays are well known in the prior art. A number of references showing various types of weather vanes and wind driven displays will now be discussed.

Bryan Pat. U.S. Pat. No. 160,150 teaches a weather vane mounted on top of a vertical pole B. A cap-like member E resting on ball bearings as shown in FIG. 5 is threaded onto the staff B. Another cap-like member D is mounted over the item E and affixed at its top portion to the tube member V. The pointer or arrow of the wind vane is rigidly connected to the tubular member V which rotates with the wind on the ball bearings via the combination of the cap D and bearing retaining member cap E.

Turner U.S. Pat. No. 215,028 teaches another weather van that is mounted on a vertical pole, as shown in FIG. 1. Although not itemized or discussed, it appears that on the lower portion of the rod cap A a unitary collar-like stop member is fixed in position on the rod cap A. Also, it appears that a unitary bushing member is either rigidly attached or placed on top of the stop member. As shown in FIG. 2, the weather vane has a centrally located hole, for permitting the weather vane to be slipped over the top of the rod cap A, down the rod and over the bushing to rest upon its lower surface on the top edge of the stop member. In this manner, the weather vane is able to rotate about the rod A for indicating the direction of the prevailing wind.

Steffes U.S. Pat. No. 1,122,434 teaches the mounting of a weather vane 6 upon a lightning rod 4. Note that the retention of the weather vane 6 is similar to that disclosed for the weather vane of Turner U.S. Pat. No. 215,028. More specifically, the weather vane 6 is designed to slip over the lightning rod 4 and to be retained thereon via a single piece stop and bushing assembly.

Smith U.S. Pat. No. 1,953,272 discloses an advertising display that includes a mannequin-like figure and associated mechanical mechanism for making the arms and legs of the figure move along with an advertising display, advertising beer in this example, through connection to a wind driven propeller 23, as shown. The entire display is mounted on the top of a vertical pole 1.

Simmons U.S. Pat. No. 2,965,991 discloses a wind driven sign and wind vane mounted upon a vertically oriented pole 24. The mounting assembly is positioned over a vertical rod.

Mills U.S. Pat. No. 3,233,456 teaches a wind indicator for mounting upon a vertically oriented staff, in different configurations as shown in FIGS. 1-9. All of the rotatable members must be mounted by placing them over the top or bottom of the various vertically oriented portions of the rods utilized in the different configurations.

Causey U.S. Pat. No. 3,354,715 discloses a weather vane assembly for mounting upon a light pole. In one embodiment of the invention the assembly includes a commutator mechanism as shown in FIG. 7 for permitting electricity to be supplied to a light bulb 36a located at the tip of an arrow of the weather vane. The fixture disclosed must be mounted over the top portion of the light pole 12, as shown in FIGS. 1, 3 and 7. Accordingly, a two piece light pole 12 must be utilized.

Kupperman et al U.S. Pat. No. 4,031,656 discloses a wind driven toy having a split ring mounting member 38, for permitting the toy to be mounted onto handlebars 46 of a bicycle as shown in FIGS. 3 and 4. This mounting feature substantially rigidly secures the toy to the handlebars 46 for permitting a bicyclist to cause the propeller 22 to turn due to the prevailing wind or the forward motion of the bicycle creating a wind effect.

SUMMARY OF THE INVENTION

An object of the present invention is to provide a novel wind vane end display that is easily mountable on a vertical pole, at any desired position thereon, without necessitating assembly via slipping the apparatus over the top of the vertical pole.

Another object of the invention is to provide an improved wind vane-like display for mounting at any desired position on a light post, without necessitating disassembly of the light post.

With these and other objects in mind, the present invention includes a stop member in the form of a split-collar-like ring for mounting at a desired position upon a vertical post in a rigid or fixed manner, a rotatable collar that is split into two pieces for providing easy mounting upon the vertical post for rotation thereabout and about the top of the stop member, and at least one radially extending mounting bracket from the rotatable collar for mounting thereto a figure such as a mannequin, or an advertising sign, that is rotated into the direction of the wind.

BRIEF DESCRIPTION OF THE DRAWINGS

Various embodiments of the present invention will be described and illustrated with reference to the drawings, wherein like items are indicated by the same reference designation, in which.

DESCRIPTION OF THE PREFERRED EMBODIMENTS OF THE INVENTION

Figure 1:
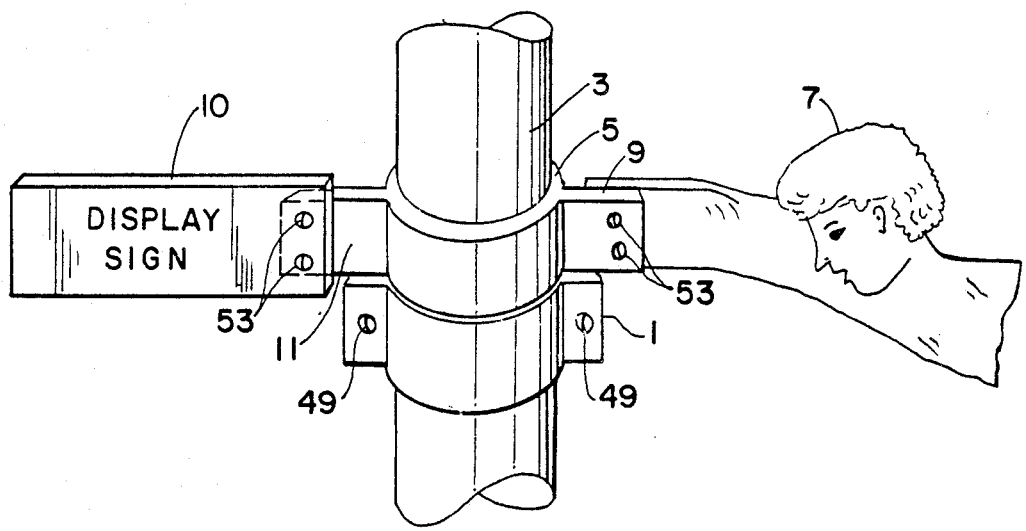
FIG. 1 is a partial pictorial drawing showing one embodiment of the invention.

As shown in FIG. 1, in one embodiment of the invention a stop member 1 is rigidly mounted at a desired position on a vertical pole, such as a lamppost or flagpole 3, for example. A rotatable collar-like member 5 is mounted directly above the collar-like stop member 1. As illustrated, in this example a mannequin 7 is fixedly mounted via screws 53 to a radially extending flange 9 of the rotatable collar 5. Also, another mannequin or a display sign 10 is mounted via screws 53 at the opposite side of the collar 5 to another radially extending flange 11, thereof. Although captively mounted upon the vertical post 3, the rotatable collar 5 is of greater inside diameter than the outside diameter of the post 3, permitting the former to rotate about the post 3 on top of the top edge or surface 13 (see FIG. 3) or of the stop member 1. In practice, it is desirable to have the mannequin or displays 7 and 9 counterbalance one another, in order to prevent binding of the rotatable collar 5 against the post 3 and/or top edge of the stop member 1. In this manner, the display signs 10 and/or mannequins 7 will be rotated in accordance with the direction of the prevailing wind, assuming the same are mounted on an outside post 3. If desired, the display sign or second mannequin 10 can be replaced by a counterbalancing weight mounted to flange 11 for counterbalancing the weight of the mannequin 7 or display 10.

Figure 2:
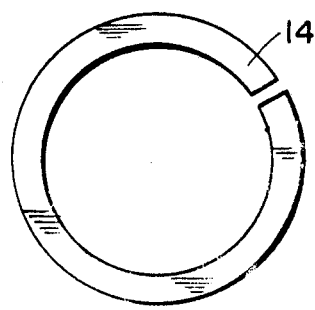
FIG. 2 is a top view of a split-ring washer of one embodiment of the invention.

In order to reduce the friction between the rotatable collar 5 and top edge of the stop member 1, a split ring washer 14, as shown in FIG. 2, fabricated from a low-coefficient of friction material such as Teflon or nylon, can be easily snapped over the post 3 between the rotatable collar 5 and stop member 1. Alternatively, the top edge of the stop member 1 and/or bottom edge of the rotatable collar 5, can be coated with a low-coefficient of friction material, such as Teflon or some other suitable material, for example. Similarly, the inside surface of the rotatable collar 5 can be coated with a suitable low-coefficient of friction material to substantially reduce the friction between the post 3 and collar 5, for permitting the freest possible rotation of the rotatable collar 5.

Figure 3:
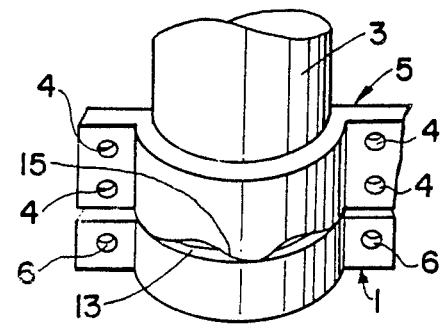
FIG. 3 is a pictorial drawing of one section of a rotatable split-collar of another embodiment of the invention.

In another embodiment of the invention, shown in FIG. 3, the bottom edge 15 of the rotatable collar 5 is scalloped in order to reduce the number of surface contact points between the bottom edge of collar 5 and top edge 13 of stop member 1. Alternatively, the surface of the top edge of stop member 1 can be scalloped, and the bottom edge of the rotatable collar 5 left in a planer or unitary surface configuration. In either case, the washer 14 can also be employed. Note mounting holes 4 and 6 through collar 5 and stop member 1, respectively, in FIG. 3.

Figure 4:
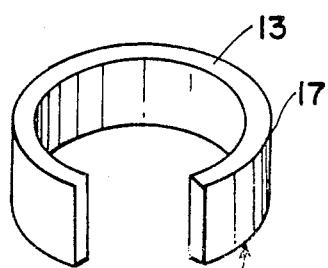
FIG. 4 is a pictorial diagram of a split-collar snap-on stop member of an embodiment of the invention.

The stop-member 1, in one embodiment of the invention shown in FIG. 4, is provided by a split-ring collar-like member 17. The material used therefor must have elastic memory characteristics, such as provided by suitable plastic materials. The inside diameter of the split-ring 17 must necessarily be less then the outside diameter of the vertical post 3 to which the stop member is to be mounted in order to permit the split-ring 17 to be snapped onto the vertical post 3 and rigidly held in position, even with the weight of the rotatable collar 5 and attached mannequins 7 and displays 10.

In one embodiment of the invention (see FIG. 5), the rotatable collar 5 can also be provided by a split-ring-like or collar-like member 19 having radially protruding mounting flanges 9 and 11 to which mannequin 7 or display signs 10 can be mounted, via mounting holes 20. The member 19 is fabricated from a material having an elastic memory, and has an inside diameter that is less than that of the pole 3. Also, rotatable member 19 includes a threaded hole 21 through a protruding end flange 23 for accepting a screw 25. The screw 25 is screwed into the hole 21 until its end 29 abuts against the inside surface of an opposing end flange 31. The screw 25 is then turned clockwise or counterclockwise for increasing or decreasing the inside diameter of the collar 5. During assembly to a post 3, the split-collar 19 is spread apart and snapped over the post 3, whereafter the screw 25 is inserted as previously described, for adjusting the inside diameter of the rotatable collar 5 to be sufficiently greater than the outside diameter of the post 3, for permitting easy rotation of the collar 5. The adjustment is made to minimize wobble of the collar 5 during rotation, while still permitting free rotation thereof.

Figure 6:
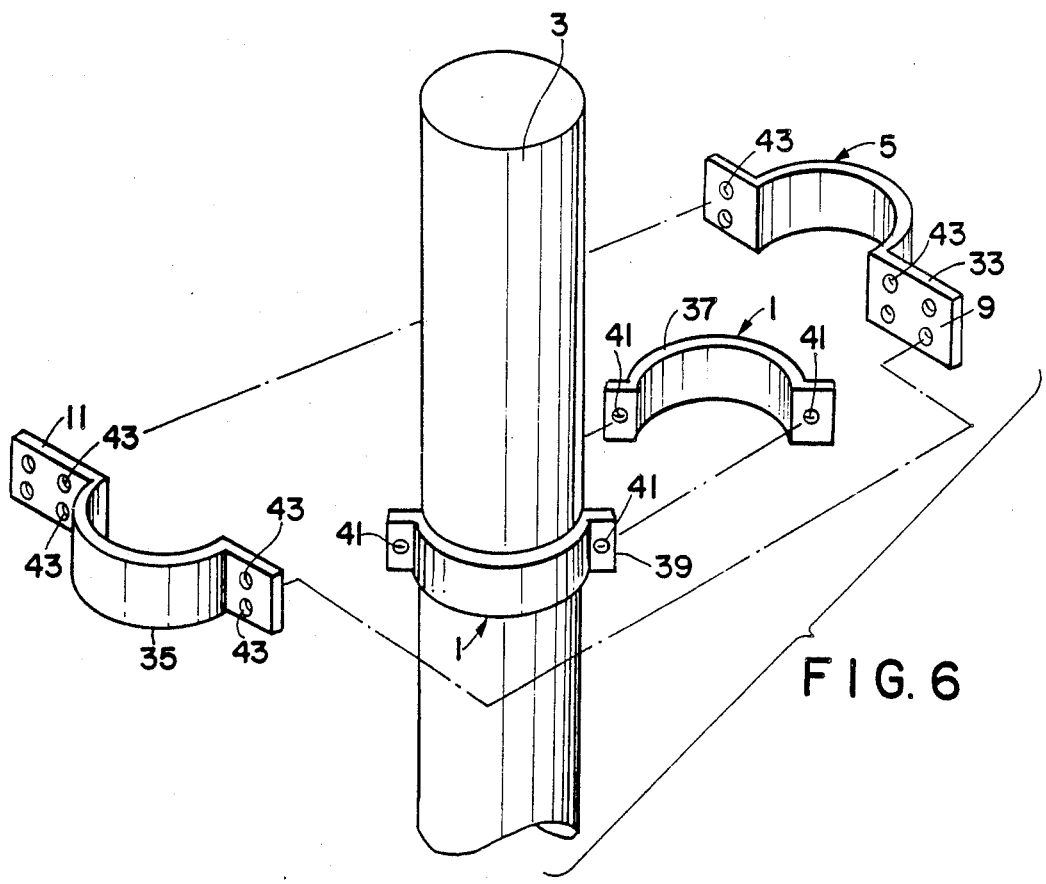
FIG. 6 is an exploded pictorial assembly diagram of another embodiment of the invention.

In another embodiment of the invention, as shown in FIG. 6, the rotatable collar 5 is provided by two substantially similar semi-circular members 33 and 35. Note that in this example, member 33 includes flange 9, whereas member 35 includes flange 11, to which mannequin 7 or displays 10 are mounted (see FIG. 1). Similarly, the stop member 1 is provided by two collar-like half pieces 37 and 39 which are substantially identical, and when mated together have an inside diameter that is less than the outside diameter of pole 3. Each piece 37, 39 includes holes 41 for accepting screws or bolts, to permit the stop member of stop-collar 1 to be mounted upon the vertical post or pole 3 via nuts and bolts (not shown). Similarly, holes 43 are provided in rotatable collar members 33 and 35 for permitting the rotatable collar 5 in this embodiment to be secured to the post 3 via nuts and bolts or screws (not shown), and mannequins 7 or displays 10 to be bolted onto members 33 and 35. In this example, the inside diameter of the mated collar pieces 33 and 35 must be slightly greater than the outside diameter of the post 3, to permit free rotation of the rotatable collar 5, but not so much greater as to permit wobbling of the collar 5 as it rotates.

Figure 7:
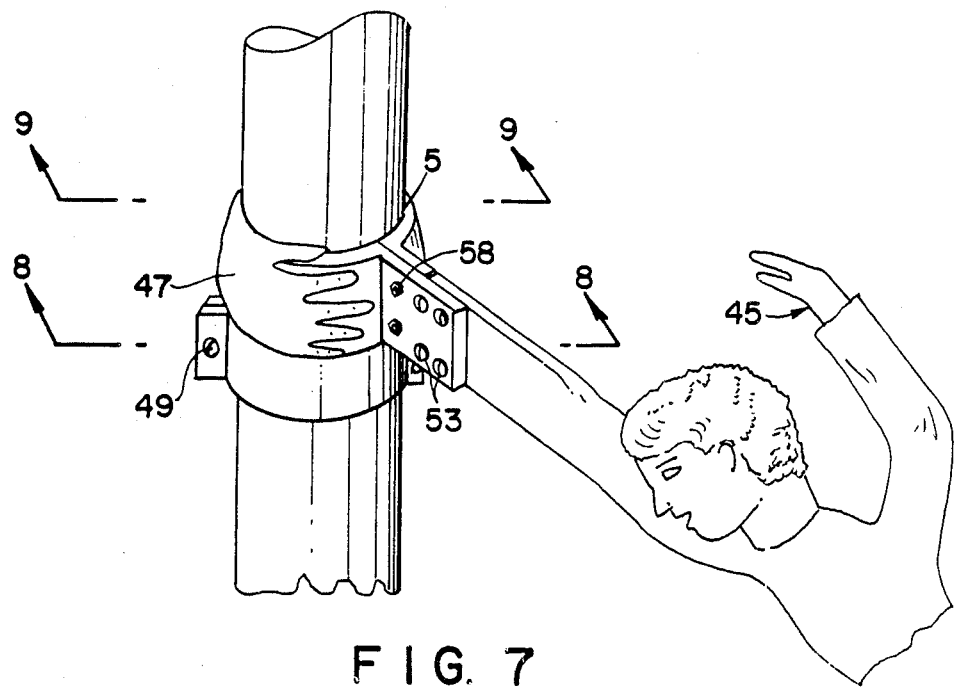
FIG. 7 is a partial or fragmentary pictorial drawing of the embodiment of the invention of FIG. 6 in an assembled state.
Figure 8:
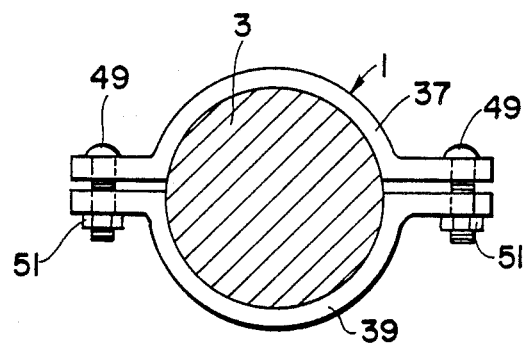
FIG. 8 is a cross-sectional view 8—8 of FIG. 7, looking down upon a two-piece stop member mounted upon a vertical post in one embodiment of the invention.

In FIG. 7, a mannequin 45 is mounted to the collar 5 in such manner that a hand 47 of the mannequin 45 appears to be grasping the pole about the collar 5, whereby the hand-like portion 47 may be weighted in such a manner to counterbalance the weight of the mannequin 45 for balancing the rotatable collar 5 about the pole 3. The cross sectional view in FIG. 8, taken about cross section 8—8 of FIG. 7, shows the rigid mounting of the half-sections 37 and 39 to a post 3 via nuts and bolts 49 and 51. Note that the stop member 1 in this embodiment is rigidly secured to post 3.

Figure 9:
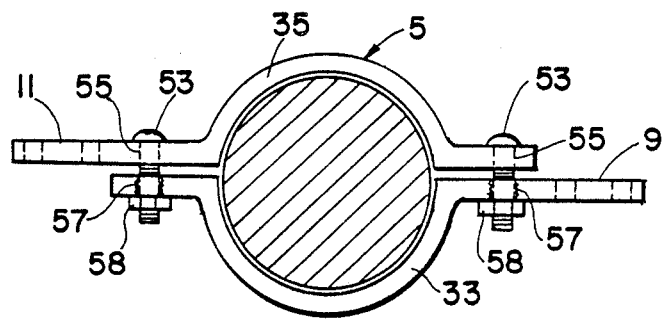
FIG. 9 is a cross-sectional view 9—9 of FIG. 7 of a vertical post looking down upon a two-piece collar member mounted for rotation on the post above the stop member of FIG. 8.

In FIG. 9, a cross-sectional view taken through section 9—9 of FIG. 7 shows the mounting of the rotatable collar 5 consisting of the two half-sections 33 and 35 secured together via screws 53 captively retained in holes 55 via non-threaded portions of the screws 53 (the forward most portions of these screws 53 being threaded). The holes 55 are threaded for accepting the screws 53 which are screwed through the holes until they are captively retained via their uppermost non-threaded portions, permitting the screws to then be screwed into threaded holes 57 of the other half-section member 33 of the rotatable collar 5 of this embodiment. The screws 53 are turned for adjusting the inside diameter between the two mated members 33 and 35 of rotatable collar 5, for permitting the collar 5 to rotate about the post 3 on top of the stop member 1. After the screws 53 are properly adjusted, nuts 58 may be threaded onto the free ends of the screws 53 for locking these screws in place. Alternatively, the inside diameter of collar pieces 33 and 35, when the pieces are abutted together, can be made slightly greater than a given post's outside diameter, permitting the pieces 33, 35 to be bolted or screwed together for rotation about a post 3 of given diameter.

Figure 10:
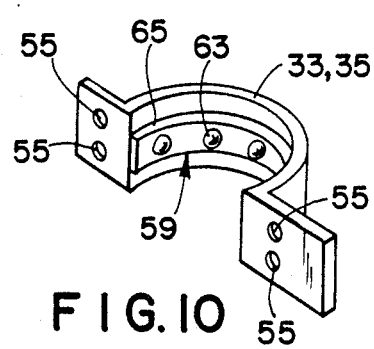
FIG. 10 is a pictorial diagram of a split half-section of a rotatable collar of an embodiment of the invention including ball bearings.
Figure 11:
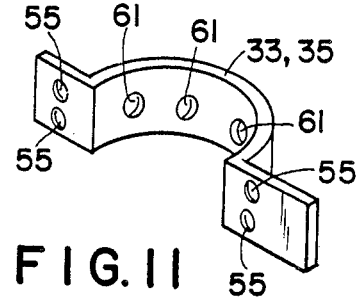
FIG. 11 is a pictorial diagram of one portion of the embodiment of FIG. 10.
Figure 12:
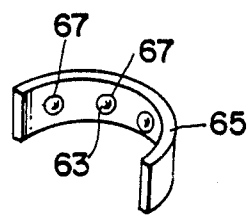
FIG. 12 is a pictorial drawing of another portion of the embodiment of FIG. 10.

In another embodiment of the invention, as shown in FIG. 10, the substantially identical two half-sections 33, 35 for the rotatable element 5 each include a ball bearing raceway 59. The ball bearing raceway 59 is rigidly attached about the inner circumference of the rotatable elements 33, 35, as shown. Each of these elements 33, 35 may for example, be modified to include spaced about a central portion of the inner circumference a number of holes 61 for captively retaining ball bearings 63, as shown in FIG. 11, whereby a retaining band 65 (see FIG. 12) having a plurality of appropriately spaced holes 67 may be epoxied, for example, about the circumference as shown in FIG. 10, for retaining the ball bearings 63 therebetween. Alternatively, the retaining band 65 of FIG. 12 can itself be fabricated for rotatively retaining the ball bearings 63, whereby the necessity for machining retaining holes 61 in the rotatable sections 33, 35 can be eliminated. In this alternative embodiment, the band-like raceway 65 modified to retain the ball bearing 63 is merely positioned about the circumference of its associated rotatable element 33 or 35, and epoxied into position, for example. In this manner, through the use of the ball bearings 63, the rotational element 5 will more freely rotate about the pole 3.

Figure 13:
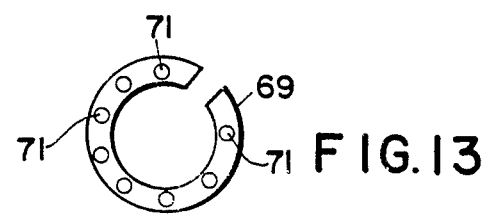
FIG. 13 is a top view of a split ring washer-like ball bearing assembly of another embodiment of the invention.

Even greater freedom of rotation is obtainable through another alternative embodiment, whereby the low friction washer 14 of FIG. 2 is replaced by a washer-like ball bearing raceway 69, as shown in FIG. 13. The split-washer-like raceway includes captively retained ball bearings 71, as shown, for reducing the friction between the lower edge of the rotatable element 5 and the upper edge of the stop-member 1.

Figure 14:
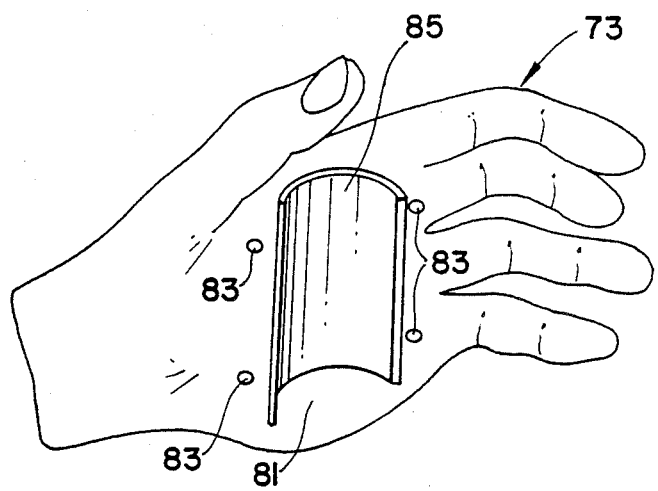
FIG. 14 is a pictorial side view of a portion of another embodiment of the invention.
Figure 15:
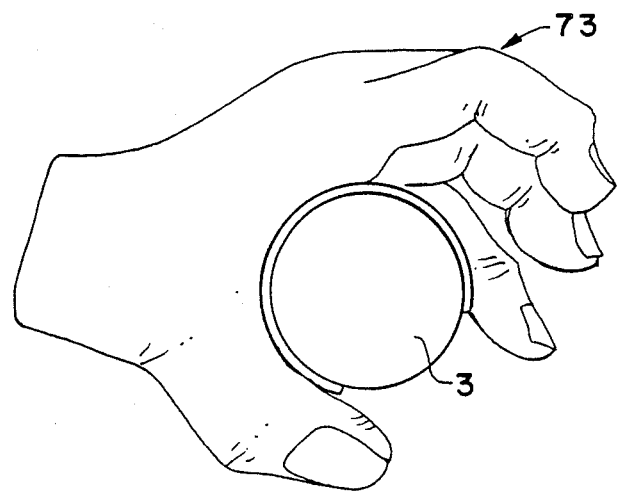
FIG. 15 is a pictorial top view of the embodiment of FIG. 14.
Figure 16:
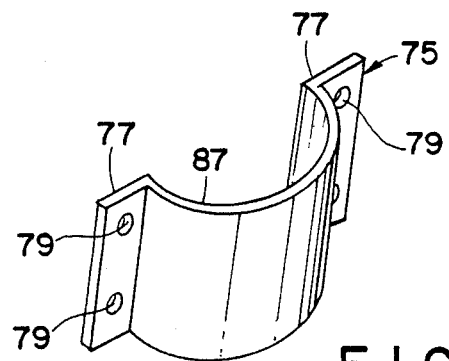
FIG. 16 is a pictorial view of the remaining portion of the embodiment of FIGS. 14 and 15.

In FIGS. 14 and 15, a hand 73 is shaped to "grasp" or partially encircle a post or pole 3 above a stop member 1 (see FIG. 6). A semicircular clamp or collar member 75 is dimensioned for assembly on the pole 3 immediately opposite the hand 73, whereby the flanges 77 of collar member 75 are bolted or screwed (by bolts or screws which are not shown) via through holes 79 to the palm 81 of hand 73 via threaded holes (in this example) 83 located in the palm 81 to align with holes 79 of collar 75. The palm 81 includes a smooth, semicircular bearing surface 85 between the holes 83. The radius of the bearing surface 85, and the radius of the inside bearing surface 87 of collar 75, are dimensioned to permit rotation of the hand 73 about the pole 3 and upon stop member 1, when collar member 75 is rigidly attached to the palm 81 of hand 73. In other words, the inside diameter of the circular hole formed by the mated ones of hand 73 and collar member 75, is slightly greater than the outside diameter of post 3, permitting rotation of the hand upon the top edge of stop member 1 about post 3.

Figure 5:
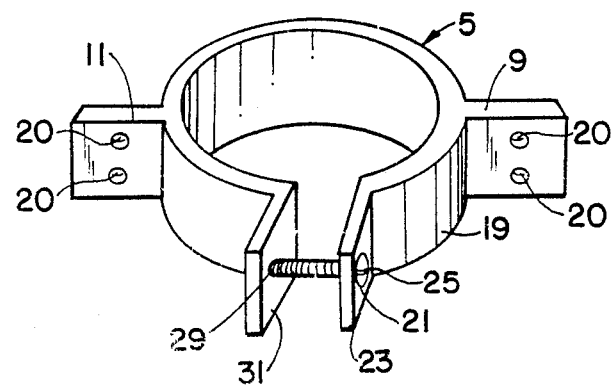
FIG. 5 is a pictorial drawing of a split-ring rotatable collar of an embodiment of the invention.

The hand 73 can be attached to a mannequin such as 7 in FIG. 1. Similarly, a foot, lion's paw, bear's paw, or bird's claw, can be substituted for hand 73, to in a similar manner rotate a mannequin, lion, bear, or bird, respectively, and so forth, about a post 3. Also, the hand 73 can be fabricated about a rotatable collar 5 as shown in FIG. 5, whereby the hand is made from the same material.

Although various embodiments of the invention are shown and described herein for purposes of illustration, none are meant to be limiting, and other embodiments and variations thereof may occur to one of ordinary skill in the art, which are meant to be covered by the spirit and scope of the appended claims.

What I claim is:

1. A weather vane display apparatus for direct mounting at any desired position on a vertical post without requiring disassembly of the post or initiation of the mounting of said weather vane from the top or bottom of said post, comprising: a collar-like stop member adapted for rigid clamping about said vertical post directly at a desired position, said stop member having an upper edge; and a collar-like rotatable element adapted for captive clamping around said vertical post, directly and immediately above said stop member, whereby the inside diameter of said rotatable element is greater than the outside diameter of said post at the mounting position, for permitting rotation of said rotatable element about said post and upon the upper edge of said stop member, said rotatable element including mounting bracket means having mounted thereto at least one display sign or mannequin, whereby the latter are rotated to a position in accordance with the direction of the prevailing wind at a given time, said rotatable element further including a split ring and means for selectively adjusting within a range the distance between ends of said split ring for controlling the inside diameter of said split ring.

2. The apparatus of claim 1, wherein said collar-like rotatable element is shaped to appear to be a hand clasping said vertical post.

3. The apparatus of claim 1, wherein said split ring is spread apart for direct mounting of said ring upon said pole above said stop member, whereafter said adjusting means is used to make the inside diameter of said split ring greater than the outside diameter of said post, for permitting rotation of said split ring about said post and upon the top edge of said stop member.

4. The apparatus of claim 3, wherein said collar-like rotatable element is shaped to appear to be a hand clasping said vertical post.

5. The apparatus of claim 3, wherein said adjusting means includes radially outward extending studs from each opposing end of said split ring, and means for selectively adjusting the distance between said studs to adjust the inside diameter of said split ring.

6. The apparatus of claim 1, further including a split ring washer fabricated from low friction material, said split ring washer being spread apart for snap mounting upon said post between said stop member and said rotatable element.

7. A weather vane display apparatus for direct mounting at any desired position on a vertical post without requiring disassembly of the post or initiation of the mounting of said weather vane from the top or bottom of said post, comprising:
   a collar-like stop member adapted for rigid clamping about said vertical post directly at a desired position, said stop member having an upper edge; and
   a collar-like rotatable element adapted for captive clamping around said vertical post, directly and immediately above said stop member, whereby the inside diameter of said rotatable element is greater than the outside diameter of said post at the mounting position, for permitting rotation of said rotatable element about said post and upon the upper edge of said stop member, said rotatable element including mounting bracket means having mounted thereto at least one display sign or mannequin, whereby the latter are rotated to a position in accordance with the direction of the prevailing wind at a given time, wherein said rotatable element includes substantially identically first and second semicircular collar-like members, each having at one end relatively short radially outward extending bracket with bolt holes therethrough, and at their other ends a relatively long radially outward extending bracket with bolt holes therethrough, whereby said first and second members are bolted together upon said post above said stop member with the relatively short bracket of one member opposing the relatively long bracket of the other member, the long brackets providing said mounting bracket means.

8. The apparatus of claim 7, wherein one of said first and second collar-like members is shaped like a hand appearing to grasp said post.

9. The apparatus of claim 7, wherein a display sign is rigidly mounted upon one of said extending brackets, and a mannequin is mounted upon the other of said extending brackets.

10. The apparatus of claim 9, wherein the weights of said display sign and said mannequin are adjusted for counterbalancing one another.

11. The apparatus of claim 7, wherein said mannequin or display sign is rigidly mounted upon one of said long extending brackets, and a counterbalancing weight is rigidly mounted upon the other of said long extending brackets.

12. The apparatus of claim 7, further including ball bearing means rigidly mounted on the inside circumference of said first and second members for reducing the friction between said rotatable element and said post.

13. The apparatus of claim 1, further including ball bearing means located between said stop member and said rotatable element for reducing the friction therebetween.

14. The apparatus of claim 13, wherein said ball bearing means includes a split ring washer-like element in which a plurality of ball bearings are captively retained.

15. A weather vane display apparatus for direct mounting at any desired position on a vertical post, comprising:
   a stop member including substantially identical first and second semicircular collar-like members, each having outwardly radially extending brackets at their ends, said brackets including bolt holes, the diameter of said first and second semicircular collar-like members being less than the outside diameter of said post, for permitting said first and second members to be opposingly positioned upon said post at the desired location, and bolted together for rigid clamping to said post; and
   a rotatable element including substantially identically first and second semicircular collar-like members, each having at one end relatively short radially outward extending bracket with bolt holes therethrough, and at their other ends a relatively long radially outward extending bracket with bolt holes therethrough, whereby said first and second members are bolted together upon said post above said stop member with the relatively short bracket of one member opposing the relatively long bracket of the other member, the long brackets providing mounting bracket means having mounted thereto at least one display sign or mannequin, whereby the latter are rotated to a position in accordance with the direction of the prevailing wind at a given time.

16. The apparatus of claim 15, wherein one of said first and second semicircular members of said rotatable element are formed within the palm of a hand-shaped member made to appear to be grasping said post.

17. The apparatus of claim 15, wherein the weight of a display sign or mannequin mounted upon one of said long brackets is counterbalanced by the weight of a sign or mannequin mounted upon the other of said long brackets.

18. The apparatus of claim 15, further including ball bearing means rigidly mounted on the inside circumference of said first and second members of said rotatable element for reducing the friction between the latter and said post.

19. The apparatus of claim 15, further including ball bearing means located between said stop member and said rotatable element for reducing the friction therebetween.

20. The apparatus of claim 15, further including a split ring washer fabricated form low friction material, said split ring washer being spread apart for snap mounting upon said post between said stop member and said rotatable element.

21. Wind driven display apparatus for direct mounting at nay desired position on a vertical post, comprising:
   a collar-like stop member including a split ring fabricated from a material having an elastic memory, the inside diameter of said split ring being less than the outside diameter of said post, for permitting said split ring to be spread apart and snapped over said post at the desired position or height, and rigidly retained at this position via frictional engagement between said ring and said post;
   a rotatable element including a split ring fabricated from a material having an elastic memory, and means for selectively adjusting within a range the distance between the ends of said split ring for controlling the inside diameter of said split ring, whereby said split ring is spread apart for direct mounting of said ring upon said post above said stop member, whereafter said adjusting means is used make the inside diameter of said split ring greater than the outside diameter of said post, for permitting rotation of said split ring about said post and upon the top edge of said stop member; and display means attachable to said rotatable element, for being driven by wind to rotate with said rotatable element upon said collar.

22. The wind driven display apparatus of claim 21, wherein said adjusting means includes radially outward extending studs from, each opposing end of said split ring of said rotatable element, and means for selectively adjusting the distance between said studs to adjust the inside diameter of said split ring.

23. The wind driven display apparatus of claim 21, wherein said rotatable element is hand-shaped in a manner making it appear said hand-shaped element is grasping said post.

24. A weather vane display apparatus for direct mounting at any desired position on a vertical post without requiring disassembly of the post or initiation of the mounting of said weather vane from the top or bottom of said post, comprising:
 a collar-like stop member adapted for rigid clamping about said vertical post directly at a desired position, said stop member having an upper edge, wherein said stop member includes substantially identically first and second semicircular collar-like members, each having outwardly radially extending brackets at their ends, said brackets including bolt holes, the diameter of said first and second semicircular collar-like members being less than the outside diameter of said post, for permitting said first and second members to be opposingly positioned upon said post at the desired location, and bolted together for rigid clamping to said post; and
 a collar-like rotatable element adapted for captive clamping around said vertical post, directly and immediately above said stop member, whereby the inside diameter of said rotatable element is greater than the outside diameter of said post at the mounting position, for permitting rotation of said rotatable element about said post and upon the upper edge of said stop member, said rotatable element including mounting bracket means having mounted thereto at least one display sign or mannequin, whereby the latter are rotated to a position in accordance with the direction of the prevailing wind at a given time.

25. The apparatus of claim 1, wherein said collar-like stop member includes a split ring fabricated from a material having an elastic memory, the inside diameter of said split ring being less than the outside diameter of said post, for permitting said split ring to be spread apart and snapped over said post at the desired position or height, and rigidly retained at this position via frictional engagement between said ring and said post.

* * * * *